United States Patent
Stiglmaier et al.

(10) Patent No.: US 10,378,619 B2
(45) Date of Patent: Aug. 13, 2019

(54) MODULAR GUIDE RAIL OR MODULAR TENSIONING RAIL

(71) Applicant: Iwis motorsysteme GmbH & Co. KG, München (DE)

(72) Inventors: Franz Stiglmaier, München (DE); Tobias Schmid, Bronnen (DE); Renzo Perissinotto, Dachau (DE); Henning Geibel, Weßling (DE)

(73) Assignee: IWIS MOTORSYSTEME GMBH & CO. KG, München (DE)

( * ) Notice: Subject to any disclaimer, the term of this patent is extended or adjusted under 35 U.S.C. 154(b) by 80 days.

(21) Appl. No.: 15/203,539

(22) Filed: Jul. 6, 2016

(65) Prior Publication Data

US 2017/0009849 A1    Jan. 12, 2017

(30) Foreign Application Priority Data

Jul. 8, 2015 (DE) ......................... 10 2015 008 877

(51) Int. Cl.
| | |
|---|---|
| *F16H 7/06* | (2006.01) |
| *F16H 7/08* | (2006.01) |
| *F16H 7/18* | (2006.01) |

(52) U.S. Cl.
CPC ................ *F16H 7/08* (2013.01); *F16H 7/06* (2013.01); *F16H 7/18* (2013.01);
(Continued)

(58) Field of Classification Search
CPC ............. F16H 2007/0872; F16H 7/08; F16H 2007/0874; F16H 7/18; F16H 2007/0804
(Continued)

(56) References Cited

U.S. PATENT DOCUMENTS 2,210,276 A * 8/1940 Bremer ................. F16H 7/0848
                                                        474/110
2,963,918 A * 12/1960 Blakstad ............... F16H 7/0836
                                                        267/128
(Continued)

FOREIGN PATENT DOCUMENTS

| CN | 1820154 A | 8/2006 |
|---|---|---|
| CN | 102884341 A | 1/2013 |

(Continued)

OTHER PUBLICATIONS

Search Report in German Patent Application No. 10 2014 014 720.7, dated Feb. 11, 2015.
(Continued)

*Primary Examiner* — Henry Y Liu
(74) *Attorney, Agent, or Firm* — Baker & Hostetler LLP (57) ABSTRACT

A guide rail or a tensioning rail for a chain drive of an internal combustion engine, comprises two separate sliding elements associated with the same span of the chain drive and arranged on a support, the sliding elements having a sliding surface that exhibits a convex curvature in the direction of movement of the chain. This kind of rail is to be improved with respect to its producibility and its tensioning and guiding effect. The angle bisectors of the two opening angles of the two convex sliding surfaces extend relative to each other at an angle other than 0°, the sliding elements being attached to the support as separate modular components. Kits for a guide rail and a tensioning rail as well as a chain drive are provided.

19 Claims, 5 Drawing Sheets

(52) U.S. Cl.
CPC .............. *F16H 2007/0872* (2013.01); *F16H 2007/0893* (2013.01); *F16H 2007/185* (2013.01)

(58) Field of Classification Search
USPC .................................................. 474/111, 140
See application file for complete search history.

(56) References Cited

U.S. PATENT DOCUMENTS

| | | | | |
|---|---|---|---|---|
| 3,069,920 A * | 12/1962 | Cole | ................ | F16H 7/08 474/111 |
| 3,111,039 A * | 11/1963 | Peras | ................ | F01L 1/02 474/111 |
| 3,817,113 A * | 6/1974 | Pfarrwaller | ............ | F16H 7/1281 474/134 |
| 5,045,032 A * | 9/1991 | Suzuki | ................ | F16H 7/08 474/140 |
| 5,088,966 A * | 2/1992 | Suzuki | ................ | F16H 7/08 474/111 |
| 5,197,420 A * | 3/1993 | Arnold | ................ | F01L 1/348 123/90.15 |
| 5,246,404 A * | 9/1993 | Ojima | ................ | F16H 7/08 474/111 |
| 5,597,367 A * | 1/1997 | Trzmiel | ................ | F01L 1/02 474/110 |
| 5,797,817 A * | 8/1998 | Senftleben | ............ | F01L 1/02 474/110 |
| 5,820,502 A * | 10/1998 | Schulze | ................ | F01L 1/024 474/111 |
| 5,885,179 A * | 3/1999 | Lewis | ................ | F16H 7/08 474/110 |
| 5,967,922 A * | 10/1999 | Ullein | ................ | F01L 1/02 474/111 |
| 5,989,138 A * | 11/1999 | Capucci | ................ | F16H 7/08 474/109 |
| 6,013,000 A * | 1/2000 | Moretz | ................ | F16H 7/08 474/111 |
| 6,093,123 A * | 7/2000 | Baddaria | ................ | F01L 1/02 474/110 |
| 6,106,423 A * | 8/2000 | White | ................ | F16H 7/08 474/109 |
| 6,129,644 A * | 10/2000 | Inoue | ................ | F16H 7/0836 474/101 |
| 6,205,965 B1 * | 3/2001 | Stephan | ................ | F01L 1/348 123/90.15 |
| 6,213,905 B1 * | 4/2001 | White | ................ | F16H 7/06 474/148 |
| 6,238,311 B1 * | 5/2001 | Cutting | ................ | F16H 7/08 474/109 |
| 6,322,469 B1 * | 11/2001 | Markley | ............ | F16H 7/1236 474/110 |
| 6,322,471 B1 * | 11/2001 | Hashimoto | ............ | F16H 7/18 474/101 |
| 6,358,169 B1 * | 3/2002 | Markley | ................ | F02B 67/06 474/111 |
| 6,375,587 B1 * | 4/2002 | Wigsten | ................ | F16H 7/08 474/109 |
| 6,612,952 B1 * | 9/2003 | Simpson | ................ | F16H 7/08 474/111 |
| 7,018,312 B2 * | 3/2006 | Sonobata | ............ | F16H 7/0848 474/111 |
| 7,097,579 B2 * | 8/2006 | Markley | ................ | F16H 7/08 474/101 |
| 7,220,196 B2 * | 5/2007 | Ullein | ................ | F01L 1/024 474/109 |
| 7,473,197 B2 * | 1/2009 | Le | ................ | F16H 7/08 474/111 |
| 7,513,843 B2 * | 4/2009 | Markley | ............ | F16H 7/0848 474/111 |
| 7,524,254 B2 * | 4/2009 | Konno | ................ | F16H 7/18 474/111 |
| 7,537,533 B2 * | 5/2009 | Wigsten | ................ | F16H 7/08 474/101 |
| 7,597,640 B2 * | 10/2009 | Markley | ............ | F16H 7/18 474/109 |
| 7,641,577 B2 * | 1/2010 | Markley | ............ | F16H 7/08 474/109 |
| 7,955,206 B2 * | 6/2011 | Smart | ............ | F16H 7/0831 474/109 |
| 7,967,708 B2 * | 6/2011 | Hayami | ............ | F16H 7/18 474/111 |
| 8,007,385 B2 * | 8/2011 | Hirayama | ............ | F16H 7/18 474/111 |
| 8,323,136 B2 * | 12/2012 | Heinrich | ............ | F16H 7/08 474/110 |
| 8,348,792 B2 * | 1/2013 | He | ............ | F16H 7/18 474/111 |
| 8,387,244 B2 * | 3/2013 | Markley | ............ | F01L 1/022 123/90.31 |
| 8,668,608 B2 * | 3/2014 | Lee | ............ | F16H 7/18 474/111 |
| 8,696,501 B2 * | 4/2014 | Ullein | ............ | F16H 7/08 474/111 |
| 8,715,122 B2 * | 5/2014 | Young | ............ | F16H 7/08 474/111 |
| 8,740,737 B2 * | 6/2014 | Konno | ............ | F16H 7/18 474/111 |
| 8,747,263 B2 * | 6/2014 | Konno | ............ | F16H 7/18 474/111 |
| 8,888,628 B2 * | 11/2014 | Konno | ............ | F16H 7/18 474/111 |
| 8,900,079 B2 * | 12/2014 | Mori | ............ | F16H 7/18 474/111 |
| 8,992,358 B2 * | 3/2015 | Adams | ............ | B21D 26/033 474/111 |
| 9,689,475 B2 * | 6/2017 | Geibel | ............ | F16H 7/18 |

FOREIGN PATENT DOCUMENTS

| | | |
|---|---|---|
| CN | 102966709 A | 3/2013 |
| CN | 104029335 A | 9/2014 |
| DE | 195 36 643 A1 | 4/1997 |
| DE | 197 19 732 C1 | 11/1998 |
| DE | 19905579 A1 | 8/2000 |
| DE | 100 10 335 A1 | 10/2000 |
| DE | 10 2007 026 939 A1 | 12/2008 |
| DE | 10 2008 028 206 A1 | 2/2009 |
| DE | 10 2011 017769 A1 | 10/2012 |
| DE | 10 2013 214 450 A1 | 1/2015 |
| EP | 0 877 179 A1 | 11/1998 |
| JP | H02-11830 A | 1/1990 |
| JP | 2011-058552 A | 3/2011 |
| WO | 2011/056719 A2 | 5/2011 |

OTHER PUBLICATIONS

International Search Report in International Application No. PCT/EP2015/001908, dated Jan. 20, 2016.

* cited by examiner

MODULAR GUIDE RAIL OR MODULAR TENSIONING RAIL

CROSS-REFERENCE TO RELATED APPLICATION

This application claims priority to foreign German patent application No. DE 10 2015 008 877.7, filed on Jul. 8, 2015, the disclosures of which are incorporated by reference in their entirety.

FIELD OF THE INVENTION

The present invention relates to a guide rail or a tensioning rail for a chain drive of an internal combustion engine, comprising two separate sliding elements associated with the same span of the chain drive and arranged on a common support (single, preferably unitary support), the sliding elements having a sliding surface that exhibits a convex curvature in the direction of movement of the chain. A guide rail having this structural design is known from DE 19719732 C1. This guide rail comprises a support of highly load-resistant polyamide with fiber addition and slide sections arranged at the ends of this support and provided with sliding linings. The sliding surfaces of these sliding linings exhibit a convex curvature and are in contact with the tight span of a timing drive of an internal combustion engine. The linings are connected to the slide sections e.g. by means of a dovetail connection, said linings being united with the support by means of injection molding. This kind of structural design leads to reduced friction, since the guide rail area contacting the chain is subdivided into two areas. Each of these two areas applies pressure to the chain in a perpendicular direction. Primarily, this also leads to a reduction of weight and of the amount of material used. However, this kind of structural design is preferably only suitable for comparatively small chain drives, since otherwise major vibrations of the chain section between the two sliding areas may occur. The sliding elements are solely attached to the support and borne by the support and do not have a direct connection to the engine block or case.

SUMMARY OF THE INVENTION

Hence, it is the object of the present invention to provide a guide rail or a tensioning rail having a simple structural design and ensuring that in particular the chain section located between the two sliding elements runs more smoothly.

To this end, a guide rail or a tensioning rail according to the preamble is configured with the sliding elements having a predetermined position on the support such that the angle bisectors of the two opening angles of the two convex sliding surfaces extend relative to each other at an angle β other than 0°, and that the sliding elements are attached to the support as separate modular components. Two advantages are achieved in this way. On the one hand, the two angle bisectors are not oriented parallel to each other, as in the case of the above described prior art, but are preferably oriented at an acute angle relative to each other. Normally, they are preferably slightly divergent. This leads to a better adaptation to the running chain, so that also larger intermediate gaps can be bridged by a chain section, without stronger vibrations being excited in this area. The latter is prevented by the circumstance that the forces of these two sliding elements are applied at an angle relative to one another. In addition, the use of separate modular components ensures that a selection is made from a number of manageable sliding elements and that the respective sliding element having a suitably adapted length will be used. Due to the fact that the sliding elements are produced separately, it is, moreover, superfluous to introduce into an injection molding machine a support, which then has the sliding lining applied thereto by means of injection molding. On the contrary, this measure even offers the possibility of attaching the sliding elements only when the support has already been mounted to the internal combustion engine or even defines an integral component thereof.

The opening angle is here the largest angle defined by the sliding surface. However, rounded portions at the ends of the sliding surface are not to be considered as parts of the sliding surface. The measurement of the opening angle only starts where the "genuine" sliding surface begins or ends. If the sliding surface has a uniform radius of curvature, the angle bisector is easy to determine. If the sliding surface has, in addition to the central area, an entering and an exiting area with identical radii of curvature, which are, however, smaller than the radius of curvature of the central area of the sliding surface, the determination will normally be still comparatively simple. If, however, the radius of curvature changes continuously, this will complicate matters. Openings or recesses that may perhaps exist in the sliding surface are added to the curvature profile in accordance with the adjoining surface areas. The angle β, which has to be different from 0°, is, however, smaller than 180° and larger than 5°, preferably ≥15°. If the determination of the sliding surface or of the convex length thereof should be problematic or should appear to be difficult, the following determination method will be used:

The area or point having the largest radius of curvature is determined. This area or point lies, with high probability, in the area where the sliding surface is contact with the chain. Starting from a point of this area or point, the radius of curvature or the change in the radius of curvature of the sliding surface is determined both in and opposite to the direction of movement of the chain. As soon as the radius of curvature no longer amounts to more than 25% of the largest radius of curvature, or falls below this value, the (theoretical) front or rear end of the sliding surface has been reached in the direction in question, and the opening angle can be determined. According to this determination method, the last radius of curvature ≥25% of the radius of curvature is used for determining the opening angle, if the magnitude of the radius of curvature should abruptly decrease from a value above to a value below 25% of the largest radius of curvature. If the largest radius of curvature is larger than 5000 mm (including ∞), the (theoretical) front or rear end of the sliding surface will have been reached, when the radius of curvature reaches or becomes smaller than 50 mm, preferably 35 mm.

According to a variant, the two sliding elements are spaced apart at a distance corresponding to at least twice the pitch of the chain of the chain drive, so that the advantages with respect to improved vibration properties can actually take effect.

A particularly simple structural design of guide rails and of tensioning rails can be accomplished, when the sliding elements are identical modular components. According to this variant, the sliding elements used are thus exclusively sliding elements that are configured as identical components. Provided that these sliding elements have specific predetermined lengths and predetermined opening angles with associated radii of curvature, also differently configured guide rails and tensioning rails can be produced with one and the same sliding element, making use of different supports. Thus, it is possible to accomplish low production costs, especially in the case of the high numbers of pieces involved in the field of automotive engineering.

According to an advantageous embodiment, the angle β between the angle bisectors lies in the range of 15° to 55°, preferably between 25° and 45°. In this way, the effect on chain running will be optimized.

According to an embodiment, the support comprises two fastening sections for the sliding elements, said fastening sections having an identical envelope contour. This means that the fastening section has so to speak a kind of adapter shape, which can be connected to the identical sliding elements. Provided that the most important functional areas and portions required for this purpose are provided, the remainder of the structural design of the fastening section is of secondary importance, and this is why the term envelope contour is used in this context. In most cases, the fastening sections will, however, have identical structural designs.

In order to avoid, as far as possible, the necessity of using tools for mounting the guide rail or the tensioning rail, the sliding elements and the fastening sections are interconnected by means of a snap-on connection according to one variant.

If a larger guide rail or tensioning rail is to be used, which provides e.g. more support to the chain, a variant may be configured such that at least one additional sliding element is interposed between the two sliding elements, the angle bisector of the opening angle of the convex sliding surface of said additional sliding element extending at an angle other than 0° relative to the angle bisector of the opening angle of the convex sliding surface of at least one of the two sliding elements, and said additional sliding element being also mounted on the support as a separate modular component. Preferably the centre point(s) of the curvature (centre point(s)) of the radius/radii forming the curvature) of a first sliding element is/are spaced apart from the centre point(s) of the curvature (centre point(s) of the radius/radii forming the curvature) of the at least one other sliding element. As a result, the guide rail or tensioning rail can have different curvatures depending on the angle β and the positions of the centre points chosen. This is distinct from a rail having a single radius curvature as in DE 102007026939 A1. Preferably, this additional sliding element is also configured such that it is identical with the other sliding elements. The additional sliding element may also directly follow at least one of the two sliding elements. If at all, only a small gap or a small distance may here be provided, so as to allow reasonable mounting. Such successive sliding elements may also support a curved profile of the chain over a comparatively large area or they may provide a support that changes its position (like in the case of a pivotably arranged tensioning rail).

According to a further embodiment, the support is a flat sheet-metal rail, on which the two or the plurality of fastening sections are bent as perpendicular fastening lugs, the sliding elements being adapted to be attached to these fastening lugs in a direction perpendicular to the direction of movement of the chain and to be locked in position thereon. The support is therefore a sheet-metal part that can be produced by a simple stamping and bending operation. Such a sheet-metal part provides sufficient stability and the fastening lugs bent thereon efficiently support the sliding elements. Such an embodiment is preferably used for guide rails. A support having such a simple structural design can also be produced from other materials.

Alternatively, the support may, however, also be a reinforced plastic component with fastening sections, the sliding elements that are suitable for use according to claim 8 being adapted to be attached to or pushed onto these fastening sections in or opposite to the direction of movement of the chain, and to be locked in position thereon. This kind of structural design is often used for tensioning rails, since the latter often have higher sidewalls. In view of the fact that a support for a tensioning rail is pivotably arranged, it will also make sense to provide a larger, i.e. broader bearing surface, so as to avoid wear, which would occur more rapidly if a mere sheet-metal support were used. The sliding elements are configured such that they are adapted to be attached to a sheet-metal rail according to claim 8 as well as to be moved to a detent position in the longitudinal direction. Hence, one and the same sliding element is configured for different fastening modes.

A variant which proved to be advantageous in this context is so configured that the back of the sliding element is provided with a recess of T-shaped cross-section, said recess having at least one, preferably two detent elements for locking engagement with the support.

The flanges delimiting the undercut area of the T-shaped recess may be resilient to such an extent that they allow locking engagement as a result of a longitudinal displacement (cf. claim 9). The genuine T-shape is suitable for pushing the sliding element onto a fastening lug, which fastening lug may have one or a plurality of openings that are adapted to enter into locking engagement with complementary projections within the T-shaped recess. However, the structural design may also be configured the other way round (projections on the fastening lug and openings in the T-shaped recess). In the case of the fastening mode according to claim 9, the resilient component of the snap-on connection may also be provided on the support.

In addition, the present invention relates to a kit for a guide rail and/or a tensioning rail, comprising at least two different supports and at least one sliding element configured as a modular component for use on the at least two different supports, wherein the sliding elements have sliding surfaces that exhibit a convex curvature in the direction of movement, and wherein each support is configured such that the angle bisectors of the two opening angles of the two convex sliding surfaces of two sliding elements extend at an angle other than 0° relative to each other, when these sliding elements are attached to the support. It follows that guide rails and/or tensioning rails exhibiting different support profiles of their sliding surfaces can be produced making use of a small number of components.

According to a particularly advantageous embodiment, all the sliding elements are identical modular components. In this case, only a single tool, e.g. an injection molding tool, is required for producing such a sliding element.

The present invention also relates to a chain drive, in particular a timing chain drive of an internal combustion engine, comprising a driving chain wheel and at least one driven chain wheel, a chain interconnecting said chain wheels, and a tensioning rail or a guide rail according to one of the claims 1 to 10. The guide rails are normally used in the tight span of a timing chain drive and the tensioning rails in the slack span, i.e. they are respectively used between the crankshaft chain wheel and the at least one camshaft chain wheel. The structural design chosen here offers the possibility that, when an engine is redesigned, it may perhaps suffice to adapt the respective support and to then use on said adapted support a sliding element chosen from the kit.

According to a preferred embodiment, the tensioning rail as well as the guide rail of such a chain drive may be configured according to one of the claims 1 to 10. The existing advantage will thus be increased once more.

Accordingly, it will also be of advantage, when the individual components of the tensioning rail as well as those of the guide rail are selected from a kit according to one of the claim 11 or 12.

BRIEF DESCRIPTION OF THE DRAWINGS

In the following, embodiments of the present invention will be explained in more detail making reference to a drawing, in which.

DETAILED DESCRIPTION

Figure 1:
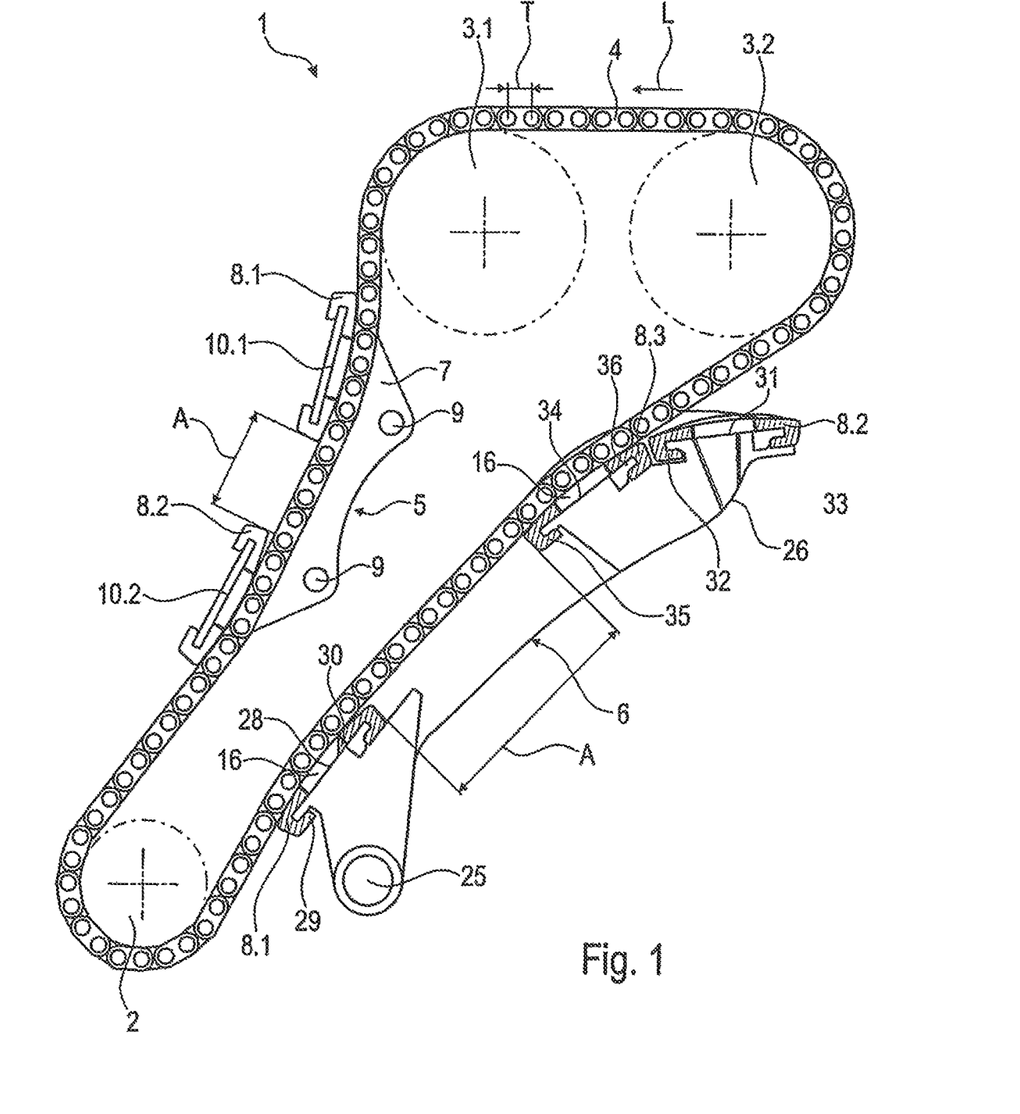
FIG. 1 shows a schematic front view of a timing chain drive.

The timing chain drive 1 for an internal combustion engine shown in FIG. 1 substantially comprises a crankshaft chain wheel 2, two juxtaposed camshaft chain wheels 3.1 and 3.2, a timing chain 4 wrapped around these chain wheels, a guide rail 5 fixed to the crankcase and a tensioning rail 6 that is pivotably arranged on the crankcase. Normally, the tensioning rail 6 is pressed against the timing chain 4 by means of a chain tensioner, which is not shown. The chain tensioner is normally connected to the engine oil hydraulic system and its tensioning piston presses against the tensioning rail 6. The crankshaft chain wheel 2 drives the two camshaft chain wheels 3.1 and 3.2 by means of the timing chain 4. The tight span of the chain 4 thus slides along the guide rail 5 and the slack span along the tensioning rail 6. The chain tensioner must apply a sufficiently strong force to the tensioning rail 6, so that reliable tensioning of the timing chain 4 will be guaranteed throughout the whole operating range of the internal combustion engine. This leads to highly dynamic processes within the chain tensioner, which also provides a damping function.

With the aid of FIG. 2 to 6, a detailed structural design of an embodiment of a guide rail 5 according to the present invention will be explained in more detail hereinbelow, said guide rail 5 being used for the chain drive 1 according to FIG. 1. The timing chain 4 shown is a bush-type chain with a pitch T.

Figure 2:
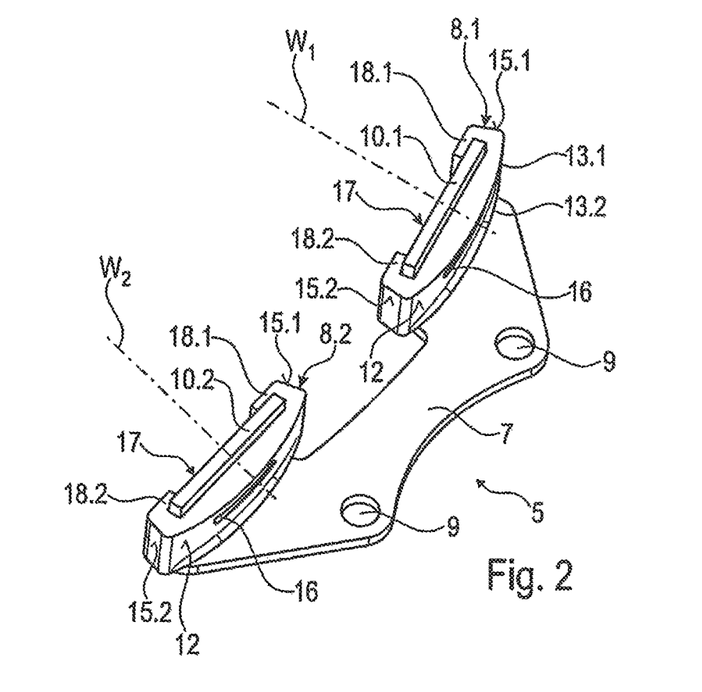
FIG. 2 shows a perspective view of the guide rail according to FIG. 1.
Figure 3:
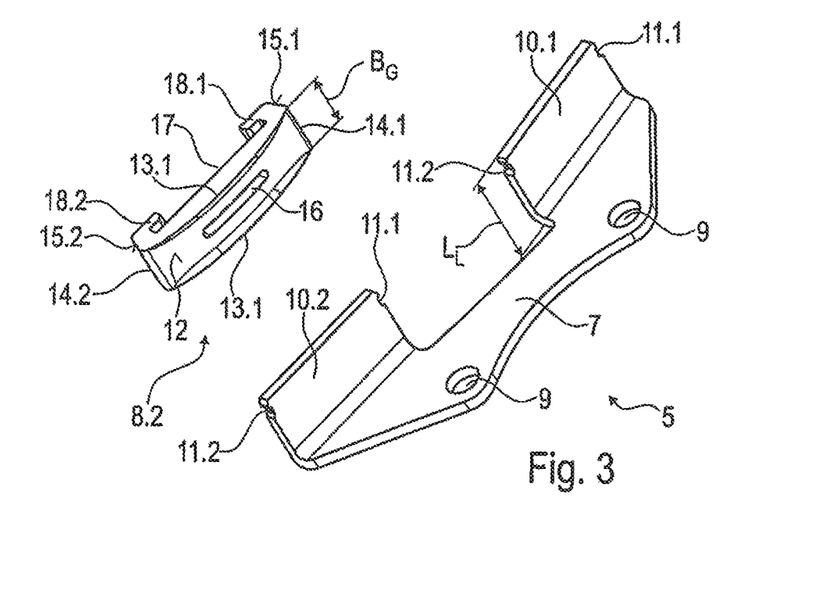
FIG. 3 shows an exploded view of the guide rail according to FIG. 2, with one sliding element omitted so as to simplify matters.
Figure 4:
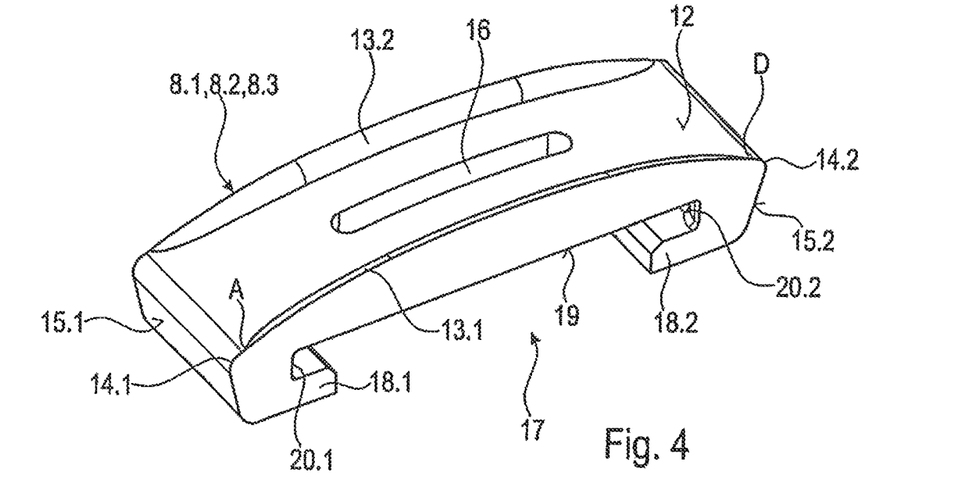
FIG. 4 shows an enlarged perspective view of a sliding element.

The guide rail 5 comprises three components. These are a support 7 made of a steel sheet, on the one hand, and two sliding elements 8.1 and 8.2, which are connected to the support 7, on the other. The support 7 has a flat main body with two fastening openings 9 with the aid of which it is fixed to the crankcase. Two fastening lugs 10.1 and 10.2, which are bent at right angles, project from this main body. The fastening lugs 10.1 and 10.2 define the fastening sections of the otherwise flat support 7. The projecting length $L_L$ of the fastening lugs 10.1 and 10.2 is slightly larger than the width $B_G$ of the sliding elements 8.1 and 8.2, respectively. At a small distance from the free edge of the fastening lugs 10.1 and 10.2, the lateral edges have each formed therein a rounded opening 11.1 and 11.2, respectively.

Figure 5:
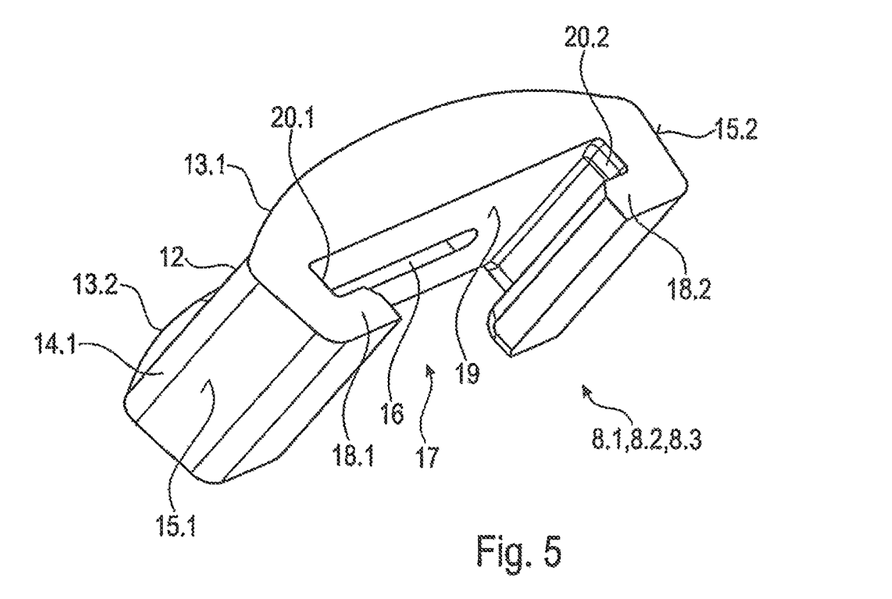
FIG. 5 shows a perspective bottom view of the sliding element according to FIG. 4.

The sliding elements 8.1 and 8.2 are each produced from a low-friction plastic material. This is normally done by injection molding. Each sliding element 8.1, 8.2 has a convex sliding surface 12 on the upper side thereof, said sliding surface 12 coming into contact with the chain 4. The sliding surface 12 is laterally delimited by guide rims 13.1 and 13.2. Making use of a rounded portion 14.1 and 14.2, the sliding surface 12 merges at the front and at the rear end thereof with the lateral faces 15.1 and 15.2 that extend towards each other in a wedge-shaped manner. The sliding surface has at the center thereof an elongated hole 16, which extends through the material right to the back. On the back, the sliding element 8.1, 8.2 is provided with a recess 17 having a substantially T-shaped cross-section. Due to this T-shaped recess 17, two projecting legs 18.1 and 18.2 are defined on the back. The distance between the inner side of the legs 18.1 and 18.2 and the bottom 19 of the T-shaped recess is chosen such that a respective fastening lug 10.1 and 10.2 can be pushed thereinto. At one end of the T-shaped recess (in FIG. 4 at the front end), projections 20.1 and 20.2 are provided in said T-shaped recess, said projections 20.1 and 20.2 being adapted to enter into locking engagement with the openings 11.1 and 11.2 of the fastening lugs 10.1 and 10.2. This structural design allows the sliding elements 8.1 and 8.2 to be laterally attached to and to be brought into locking engagement with the fastening lugs 10.1 and 10.2 very easily. The sliding elements 8.1 and 8.2 are here so elastic that the projections 20.1 and 20.2 slide along the outer edges of the fastening lugs 10.1 and 10.2 and enter then into locking engagement with the openings 11.1 and 11.2, respectively. The free ends of the fastening lugs 10.1 and 10.2 will then slightly project. The upper side of the fastening lugs 10.1 and 10.2 then cover the open elongated hole 16 from below. In this space, lubricant can accumulate during future operation.

As regards the fastening lugs 10.1 and 10.2, it should be pointed out that they extend towards each other at a slightly oblique angle. This means that the upper sides thereof do not define a common plane and are not oriented parallel to one another, but are slightly tilted at an angle relative to each another. This has the effect that also the sliding elements 8.1 and 8.2 are rotationally displaced to a minor extent relative to each other. Making reference to FIG. 6, this will be explained on the basis of an example, in the case of which the sliding surface 12 is composed of three sections having different radii of curvature. This representation essentially aims at determining an opening angle $\alpha_1$ and $\alpha_2$ for the sliding elements 8.1 and 8.2, respectively, and to then ascertain a corresponding angle $\beta$ between the angle bisectors $W_1$ and $W_2$ of the two opening angles $\alpha_1$ and $\alpha_2$ of the sliding elements 8.1 and 8.2.

Figure 6:
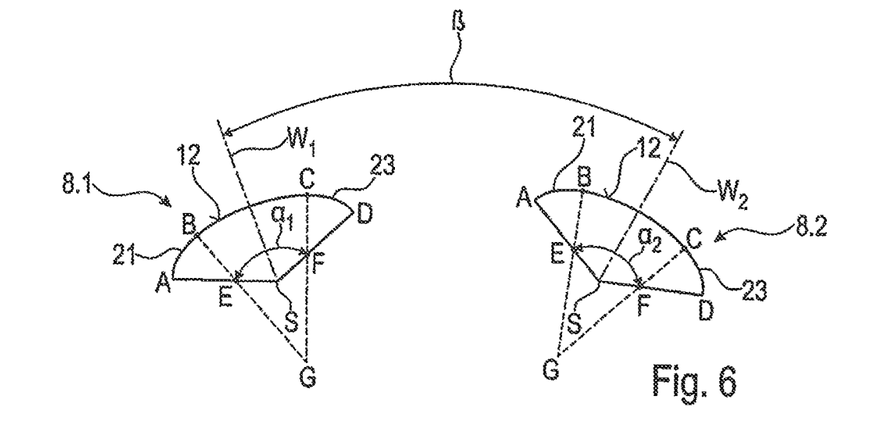
FIG. 6 shows a schematic diagram for explaining the arrangement of the two sliding elements.

Each of the sliding elements 8.1, 8.2 has on its sliding surface 12 an entering section 21, a central section 22 and an exiting section 23. The entering section 21 of the sliding element 8.1 has a radius of curvature with the distance A-E. The central section 22 has a radius of curvature with the distance B-G and the exiting section 23 has a radius of curvature with the distance D-F. From this point of view, the points A and D are located where the actual sliding surface 12 begins, i.e. without the rounded portions 14.1 and 14.2. If this should not be exactly clear, a distance of 5 mm from the respective lateral face 15.1, 15.2 may be assumed as a secondary alternative. The centre points (E, F or G) of the curvature with the distance A-D of sliding element 8.1 are not identical to the centre points (E, F or G) of the curvature with the distance A-D of sliding element 8.2 but are spaced apart from each other. The same is true for any other sliding element in addition (e.g. sliding element 8.3). This structure allows the formation of different shapes of the guide track for the chain which a rail provides for.

For determining the opening angle $\alpha_1$ and $\alpha_2$, line A-E as well as line D-F is extended, so that a point of intersection S is obtained. The angle enclosed between these two lines is the opening angle $\alpha_1$ and $\alpha_2$. Subsequently, the angle bisector $W_1$ and $W_2$ of the angle $\alpha_1$ and $\alpha_2$ is formed. The two angle bisectors $W_1$ and $W_2$ extend at an acute angle β relative to one another. In the present embodiment the angle β is x°.

The entering section 21 extends between points A and B. The central section 22 extends between points B and C. The exiting section 23 extends between points C and D.

Due to this oblique positioning or rotational displacement of the two sliding elements 8.1 and 8.2 relative to one another, the tight span is guided in a more targeted manner between the crankshaft chain wheel 2 and the camshaft chain wheel 3.1. The distance A between the two sliding elements 8.1 and 8.2 is, in the present case, approximately four times as large as the chain pitch T and is therefore larger than twice the chain pitch T. In this area, the chain 4 is not supported by the guide rail 5. Due to the fact that the sliding elements 8.1 and 8.2 are rotationally displaced by the angle β relative to one another, optimum guidance is nevertheless provided, which leads to smoother running of the portion of the chain 4 between the sliding elements 8.1 and 8.2.

Figure 7:
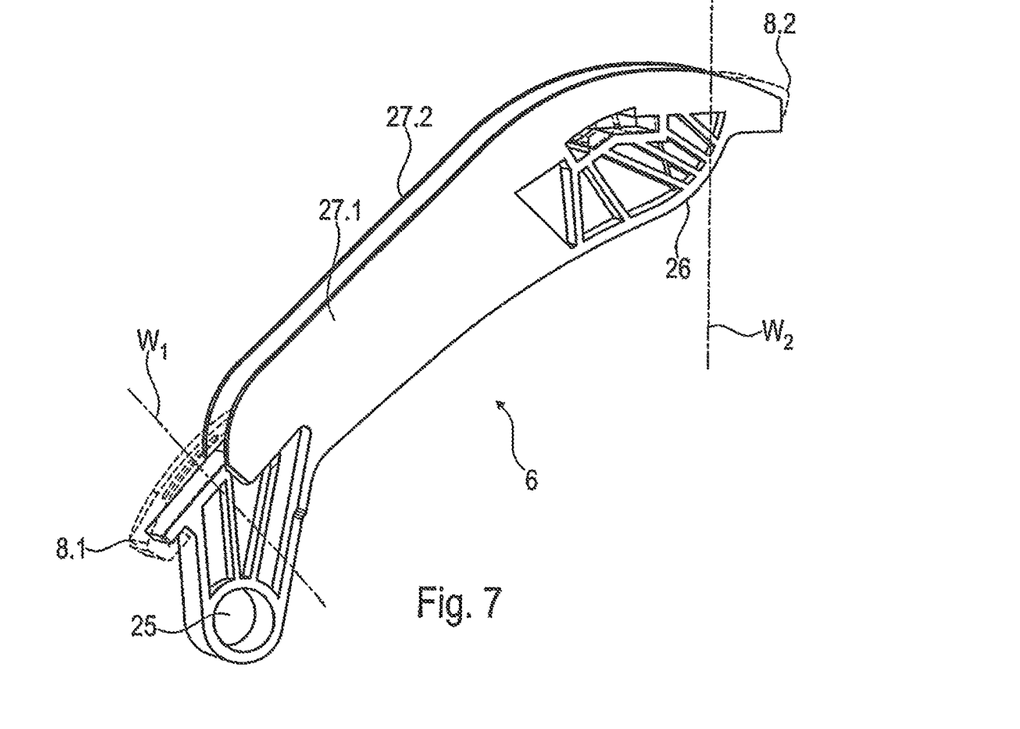
FIG. 7, shows a perspective side view of the tensioning rail according to FIG. 1.
Figure 8:
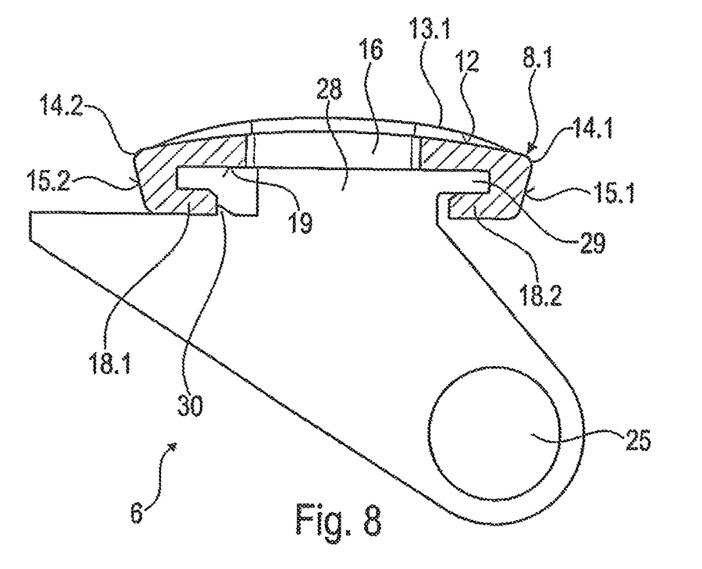
FIG. 8 shows a detail of the pivoting end of the tensioning rail in an enlarged sectional view and FIG. 9 shows a detail of the front end of the tensioning rail according to FIG. 7 in an enlarged sectional view.
Figure 9:
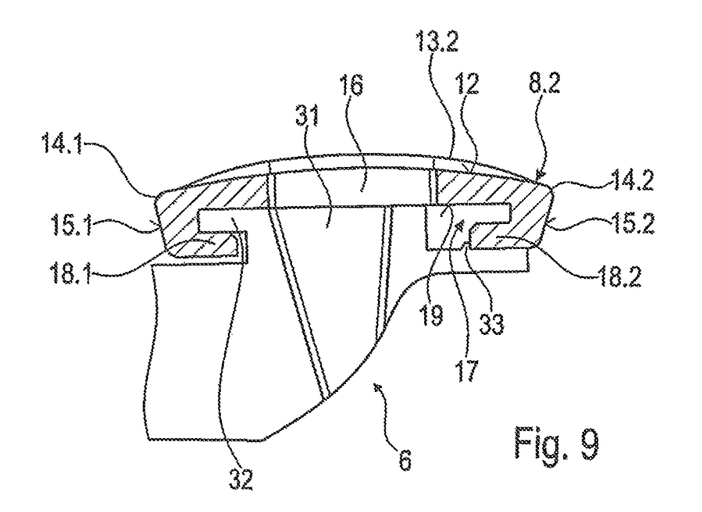

With the aid of FIG. 7 to 9, the structural design of the tensioning rail 6 will now be explained in more detail hereinbelow. Identically configured sliding elements 8.1 and 8.2 are here used; hence, reference is additionally made to FIGS. 4, 5 and 6 with identical reference numerals. In this respect the above description is referred to.

The tensioning rail 6 comprises a support 24 made of fiber-reinforced plastic. Part of this support 24 is provided with a truss structure for reasons of stability. One end has formed thereon a pivot bearing 25 and, on the other end, a convex press-on area 26 is provided, the tensioning piston (not shown) of a chain tensioner pressing onto this press-on area 26. The support 24 comprises two upright sidewalls 27.1 and 27.2. In FIG. 1, the tensioning rail 6 is shown in a full section view. In addition to the two sliding elements 8.1 and 8.2, the tensioning rail 6 has also provided thereon a further, intermediate, third sliding element 8.3. The sliding element 8.3 follows the sliding element 8.2 substantially directly, but is rotationally displaced or tilted relative thereto by another angle, so that a larger or a different area of contact with the chain 4 may be established in the free end region of the tensioning rail 6. This depends substantially on the pivot position of the tensioning rail 6. FIG. 1 essentially shows a position existing when the chain 4 is new. In the course of use, chain stretch occurs due to wear. This has the effect that the tensioning rail 6 will gradually tilt further inwards in a counter-clockwise direction and that the sliding element 8.2 will increasingly enter into contact with the chain 4. The successive mode of arrangement of these identically configured sliding elements 8.2 and 8.3 provides this extension of function in the case of the tensioning rail 6. Between the sliding element 8.3 and 8.1 a distance remains, which, in the present case, corresponds to approximately nine times the pitch T.

In the following, the mounting mode of sliding elements 8.1 and 8.2 will now be explained in more detail making reference to FIGS. 8 and 9. The sliding element 8.3 is pushed onto a corresponding fastening structure on the support 24 in the same way.

The support 24 is provided with a fastening block 28 above the pivot bearing 25, said fastening block 28 having a flange 29 protruding on one side thereof. The dimensions of the flange 29 are such that the latter can be introduced in the area between the bottom 19 and the leg 18.2. This flange 29 may also be provided with an opening, which is not shown and which is similar to an opening provided in the fastening lugs 10.1, 10.2, with which the projection 20.2 can enter into locking engagement. On the opposite side, the fastening block 28 does not exhibit such a flange 29. Instead, the support 24 is provided with a detent strip 30 that is configured to lockingly engage the end face of the leg 18.1. To this end, the sliding element 8.1 is attached such that the lower side of the leg 18.1 rests on the bevelled detent strip 30. Subsequently, the sliding element 8.1 is longitudinally displaced (in FIG. 8 to the left), so that the flange 29 will slide over the leg 18.2. As soon as the sliding element 8.1 has been displaced far enough, the end face of the leg 18.1 will snap in position on the detent strip 30. Due to the sidewalls 27.1, 27.2, the lateral orientation of the sliding element 8.1 is predetermined and the projection 20.2 enters into engagement with the opening in the flange 29, said opening being not shown. The sliding element 8.2 is mounted in the same way and in the same direction (cf. FIG. 9). To this end, the front end of the support 24 has provided thereon a fastening block 31 including a flange 32, and a detent strip 33 is provided. The distance between the perpendicular side of the detent strip 33 and the end face of the flange 32 is larger than the opening width of the T-shaped recess 17, whereas the distance between the end face of the flange 29 and the perpendicular side of the detent strip 30 essentially corresponds to the largest width of the T-shaped recess 17 minus the width of the leg 18.2.

The sliding element 8.3 is mounted in the same way and in the same direction with the aid of an identically configured fastening block 34, a flange 35 and a detent strip 36. Hence, the sliding element 8.2 is arranged ahead of the sliding element 8.3 in the sequence of sliding elements. In view of this modular structural design, it is, of course, also possible to produce rails having an even larger number of these sliding elements arranged thereon in direct succession. Due to fact that the sliding elements are arranged such that they are tilted or rotationally displaced relative to one another, different curvatures can also be created depending on the angle chosen.

The special advantage of this structural design is to be seen in that, after the fashion of a kit, two different supports, viz. the supports 7 and 24, are provided, which are each equipped with identically configured sliding elements 8.1, 8.2 and 8.3. It is thus possible to produce a great variety of guide rails and tensioning rails by simply providing suitably adapted supports. The sliding lining is exclusively created by sliding elements of the modular system. Within the modular system, it is, of course, particularly advantageous when all the sliding elements have the same structural design. Needless to say that, alternatively, the modular system may comprise e.g. sliding elements having different lengths or different radii of curvature, so as to increase the variation possibilities still further.

LIST OF REFERENCE NUMERALS 1 timing chain drive
2 crankshaft chain wheel
3.1, 3.2 camshaft chain wheels
4 timing chain
5 guide rail
6 tensioning rail
7, 24 support
8.1, 8.2, 8.3 sliding elements
9 fastening openings
10.1, 10.2 fastening lugs
11.1, 11.2 openings
12 sliding surface
13.1, 13.2 guide rims
14.1, 14.2 transition radius
15.1, 15.2 lateral faces
16 elongated hole
17 T-shaped recess
18.1, 18.2 legs
19 bottom
20.1, 20.2 projections
21 entering section
22 central section
23 exiting section
25 pivot bearing
26 convex press-on area
27.1, 27.2 sidewalls
28, 31, 34 fastening block
29, 32, 35 flange
30, 33, 36 detent strip
T pitch
$L_L$ length
$B_G$ width
$\alpha_1$ and $\alpha_2$ opening angle
S point of intersection
$W_1$, $W_2$ angle bisectors
$\beta$ angle

The invention claimed is:

1. A chain drive, in particular a timing chain drive of an internal combustion engine, comprising:
   a driving chain wheel;
   at least one driven chain wheel;
   a chain interconnecting said driving chain wheel and said at least one driven chain wheel, and
   a guide rail fixed to a crank case of the internal combustion engine, whereby the guide rail contacts a tight span of the chain drive, the guide rail comprising:
      two separate sliding elements associated with a same side of the tight span of the chain and arranged on a common support, the sliding elements having a sliding surface that exhibits a convex curvature in the direction of movement of the chain,
      wherein the sliding elements have a predetermined position on the support such that the angle bisectors of the two opening angles of the two convex sliding surfaces extend relative to each other at an angle other than 0°, and that the sliding elements are attached to the support as separate modular components.

2. The chain drive according to claim 1, wherein the two sliding elements are spaced apart at a distance corresponding to at least twice the pitch of the chain of the chain drive.

3. The chain drive according to claim 1, wherein a centre point(s) of the curvature of a first sliding element is/are spaced apart from a centre point(s) of the curvature of the at least one other sliding element.

4. The chain drive according to claim 3, wherein the angle between the angle bisectors lies in the range of 15° to 55°.

5. The chain drive according to claim 3, wherein the support comprises two fastening sections for the sliding elements, said fastening sections having an identical envelope contour.

6. The chain drive according to claim 5, wherein the sliding elements and the fastening sections are interconnected by means of a snap-on connection.

7. The chain drive to claim 1, wherein at least one additional sliding element is interposed between the two sliding elements, the angle bisector of the opening angle of the convex sliding surface of said additional sliding element extending at an angle other than 0° relative to the angle bisector of the opening angle of the convex sliding surface of at least one of the two sliding elements, and said additional sliding element being also mounted on the support as a separate modular component.

8. The chain drive according to claim 5, wherein the support is a flat sheet-metal rail, on which the two or the plurality of fastening sections are bent as perpendicular fastening lugs, the sliding elements being adapted to be attached to these fastening lugs in a direction perpendicular to the direction of movement of the chain and to be locked in position thereon.

9. The chain drive according to claim 1, wherein the support is a reinforced plastic component with fastening sections, the sliding elements being adapted to be attached to or pushed onto the fastening sections in or opposite to the direction of movement of the chain, and to be locked in position thereon.

10. The chain drive according to claim 1, wherein the back of the sliding element is provided with a recess of T-shaped cross-section, said recess having at least one, preferably two detent elements for locking engagement with the support.

11. A kit for guide rails or a guide rail and a tensioning rail for the chain drive according to claim 1, the kit comprising:
   at least two different supports of the guide rails or the guide rail and the tensioning rail and at least one type of sliding element configured as a modular component for use on the at least two different supports, the sliding elements each having a sliding surface that exhibits a convex curvature in the direction of movement of the chain, and each of the supports having two fastening sections of such a nature that the angle bisectors of the two opening angles of the two convex sliding surfaces of two sliding elements extend at an angle other than 0° relative to each other, when these sliding elements are attached to the two fastening sections of the supports.

12. The chain drive according to claim 1, wherein all the sliding elements are identical modular components.

13. The chain drive according to claim 3, wherein the angle between the angle bisectors lies in the range of 25° to 45°.

14. A chain drive, in particular a timing chain drive of an internal combustion engine, comprising:
   a driving chain wheel,
   at least one driven chain wheel,
   a chain interconnecting said driving chain wheel and said at least one driven chain wheel,
   a guide rail fixed to a crank case of the internal combustion engine, whereby the guide rail contacts a tight span of the chain drive, and
   a chain tensioner and a tensioning rail pivotably arranged on the crank case of the internal combustion engine, whereby the tensioning rail is pressed against a slack span of the chain drive by means of the chain tensioner, wherein each of the tensioning rail and the guide rail comprises:
    two separate sliding elements associated with a same side of the tight span or slack span of the chain, respectively, and arranged on a common support, the sliding elements having a sliding surface that exhibits a convex curvature in the direction of movement of the chain, and
    the sliding elements have a predetermined position on the support such that the angle bisectors of the two opening angles of the two convex sliding surfaces extend relative to each other at an angle other than 0°, and that the sliding elements are attached to the support as separate modular components.

15. The chain drive according to claim 14, wherein the two sliding elements are spaced apart at a distance corresponding to at least twice the pitch of the chain of the chain drive.

16. The chain drive to according to claim 14, wherein at least one additional sliding element is interposed between the two sliding elements, the angle bisector of the opening angle of the convex sliding surface of said additional sliding element extending at an angle other than 0° relative to the angle bisector of the opening angle of the convex sliding surface of at least one of the two sliding elements, and said additional sliding element being also mounted on the support as a separate modular component.

17. The chain drive according to claim 14, wherein all the sliding elements are identical modular components.

18. A chain drive, in particular a timing chain drive of an internal combustion engine, comprising:
    a driving chain wheel;
    at least one driven chain wheel;
    a chain interconnecting said driving chain wheel and said at least one driven chain wheel,
    a chain tensioner,
    a tensioning rail pivotably arranged on the crank case of the internal combustion engine, whereby the tensioning rail is pressed against a slack span of the chain drive by means of the chain tensioner, the tensioning rail comprising:
        two separate sliding elements associated with a same side of the slack span of the chain and arranged on a common support, the sliding elements having a sliding surface that exhibits a convex curvature in the direction of movement of the chain, and
        the sliding elements have a predetermined position on the support such that the angle bisectors of the two opening angles of the two convex sliding surfaces extend relative to each other at an angle other than 0°, and that the sliding elements are attached to the support as separate modular components.

19. A kit for tensioning rails or a tensioning rail and a guide rail for the chain drive according to claim 18, the kit comprising:
    at least two different supports of the tensioning rails or the tensioning rail and the guide rail and at least one type of sliding element configured as a modular component for use on the at least two different supports, the sliding elements each having a sliding surface that exhibits a convex curvature in the direction of movement of the chain, and each of the supports having two fastening sections of such a nature that the angle bisectors of the two opening angles of the two convex sliding surfaces of two sliding elements extend at an angle other than 0° relative to each other, when these sliding elements are attached to the two fastening sections of the supports.

* * * * *